Nov. 6, 1962 A. BAYER 3,062,184
DRYING DROPPINGS FROM FOWLS
Filed Nov. 21, 1960
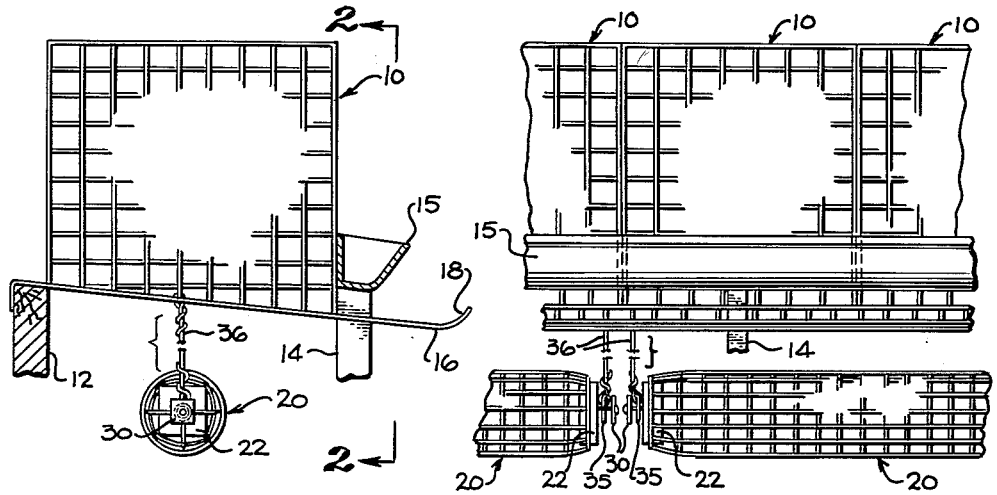
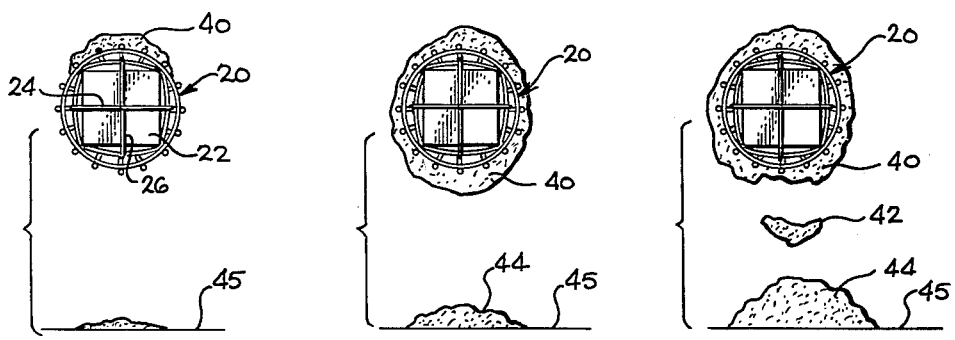
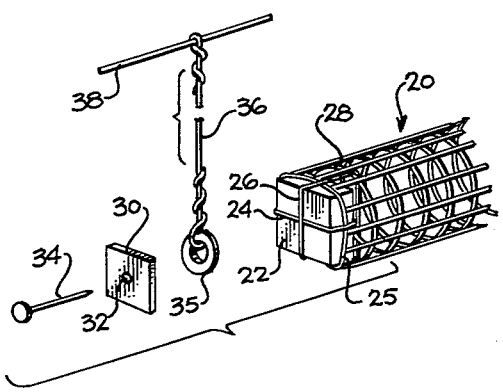
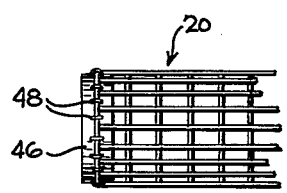
INVENTOR.
ARNOLD BAYER
BY
ATTORNEY

United States Patent Office 3,062,184
Patented Nov. 6, 1962

3,062,184
DRYING DROPPINGS FROM FOWLS
Arnold Bayer, 200 W. Allen Ave., San Dimas, Calif.
Filed Nov. 21, 1960, Ser. No. 70,627
8 Claims. (Cl. 119—22)

This invention relates to a method and apparatus for preventing the breeding of flies in the droppings from confined fowls. While the invention is adaptable in various ways to meet the requirements of different situations, it has special utility for use in modern poultry houses where large numbers of chickens are confined for commercial egg production.

The chickens are confined in long rows of wire cages adjacent suitable facilities for providing feed and water. The cages have open bottoms formed by wires that are spaced apart sufficiently to let the droppings from the chickens fall to the floor which is usually bare ground. The droppings accumulate in moist masses which retain their moisture and generate heat to remain warm as well as moist. The warm, moist masses are ideal incubators for flies which hatch and spread far and wide. The chemical reactions that are promoted by the presence of moisture creates objectionable odors that spread over the neighborhood.

Under pressure from health departments, various steps have been taken to avoid the breeding of flies in commercial poultry houses. In considering the various answers to the problem it is to be borne in mind that egg production is a highly competitive business that requires long hours of work for a very narrow profit margin.

The one reliable answer is simply to remove all of the droppings twice a week in summer and at least once a week during the rest of the year. This solution imposes substantial labor on the already burdened poultryman.

It has also been proposed to catch the droppings on elevated slats that are spaced apart to facilitate drying of the droppings. The elevated droppings are less moist than droppings on the floor but the labor required for periodically cleaning the elevated slats is about the same as the labor required for removing accumulated droppings from the floor.

Another proposal is to use fly sprays to keep down fly populations. Fly sprays do not reach the source of the problem and it is well established that flies are so adaptable that they become immune to fly toxins as fast as new insecticides are created. Fly sprays are further objectionable in that the inevitable toxic residues accumulate on surfaces and subsequently rise in dust to the detriment of public health. Finally there is the controlling fact that it is actually more expensive to use sprays than to clean out the droppings once or twice a week.

A recent trend is the development of specialized power equipment to prevent the breeding of flies by frequently breaking up and aerating the masses of accumulated droppings on the floor. Such equipment is expensive and, of course, requires periodic labor.

The present invention meets the problem by catching the droppings on an inexpensive elevated structure that is rotatable for self-cleaning action. The elevated structure is especially effective in a dry climate such as the climate of Southern California and is effective not only for completely preventing the breeding of flies but also for practically eliminating objectionable odors.

It has been found that a grid or open structure of wire elements suitably spaced apart will effectively catch the droppings and expose the droppings to air from above, below and all sides to permit the droppings to dry out promptly without giving time for flies to incubate. It has been further found that such a wire grid may be periodically rotated to bring successive portions of the grid into the paths of fall of the droppings to permit successive moist masses to accumulate, and to shift the successive moist masses out of the paths of fall for complete drying, and, further, to position successive completely dried accumulated masses of the droppings on the underside of the grid where they may break off to fall to the floor.

Such a rotary grid may be periodically rotated by hand or automatically by power means. An important feature of the preferred practice of the invention, however, is the concept of providing a freely rotatable hollow grid that turns intermittently of its own accord in response to changes in the distribution around its axis of the accumulated droppings. Thus the grid is powered by gravitation of the droppings.

It has been further found that vibration is useful in two ways. In the first place, vibrating the rotary grid promotes rotation in response to changes in the location of the center of gravity of the accumulated droppings. In the second place, vibration facilitates the breaking away of dried accumulated masses on the underside of the hollow grid to fall to the floor.

With reference to vibration a further feature of the preferred practice of the invention is the concept of suspending suitable lengths of the hollow rotary grids from the elevated cages, preferably from floor wires of the cage so that the rotary grids are vibrated by the movements of the confined fowls. Thus both the power for rotating the hollow grids and the power for vibrating the hollow grids are supplied by the birds themselves at no cost to the poultryman.

The completely processed masses of droppings that fall to the floor from the grid are too dry for fly incubation and are nearly completely free of odors. In a dry climate the floor layer of droppings may be removed as seldom as once a year. Throughout the year no labor or attention is required.

A further feature of the invention is that the rotary grid may be of simple, inexpensive construction and may be quickly installed without necessitating expensive installation labor. A satisfactory rotary grid may be fabricated by rolling welded wire fabric of suitable gauge and mesh to cylindrical configuration and attaching the two ends of the cylinder to square blocks of wood cut from ordinary two by fours. Such hollow grids may be journaled for free rotation by simply driving nails into the end blocks to serve as trunnions for rotary suspension of the grid.

The various features and advantages of the invention may be understood from the following detailed description and the accompanying drawing.

In the drawing, which is to be regarded as merely merely illustrative:

FIG. 1 is an end elevation of a row of elevated cages with a selected embodiment of the invention suspended therefrom;

FIG. 2 is a front elevation of the same structure;

FIGS. 3, 4 and 5 are somewhat diagrammatic end views of a rotary grid showing different stages in the accumulation of masses of droppings on the grid and the dropping of dried masses from the grid;

FIG. 6 is an exploded view of the end structure of a grid; and

FIG. 7 is a fragmentary elevation of a modified form of grid.

FIGS. 1 and 2 show a conventional row of cages 10 supported at the rear by a longitudinal beam 12 and supported at the front by a plurality of spaced posts 14, the posts extending to the underside of a longitudinal trough 15 which is connected to the row of cages. The cages 10 are conventional construction being made, for example, of 14 gauge galvanized welded wire fabric. The spaced wires of the bottoms of the cages are inclined forward and downward and have extensions 16 with upwardly curved ends 18 to form a forward wire trough into which the eggs roll from the cages.

In the selected embodiment of the invention a row of individual grids 20 positioned end to end extends under the row of cages 10 longitudinally thereof at a suitable level spaced above the floor. In the construction shown, each of the grids 20 is a hollow grid of generally circular construction 48 inches long. The axis of the row of grids 20 is in the path of fall of the droppings from the fowls in cages 10 and for this purpose may be spaced 8 to 10 inches forward from the rear edges of the cages. The individual grids may be of any suitable construction. In the construction shown each grid comprises a piece of 14 gauge galvanized welded wire fabric having a 1 inch by 2 inch mesh, the piece of fabric being rolled into a cylinder of approximately 5 inches in diameter with the 2 inch dimension of the mesh extending longitudinally of the cylinder and the 1 inch dimension of the mesh extending circumferentially of the cylinder. In this embodiment, the grids are of inexpensive construction and the ends of the welded wire fabric cylinder are mounted on square blocks of wood 22 which are cut from conventional two by four lumber, each block being 3⅝ inches by 3⅝ inches. In the construction shown each end of the welded wire cylinder is attached to the corresponding block 22 by two wire loops. One wire loop 24 engages the wire 25 at the end of the welded wire cylinder and the other wire loop 26 engages the next wire, i.e., the wire 28 that is second from the end of the welded wire cylinder.

The manner in which each end of a hollow rotary grid 20 is journaled and suspended from a cage 10 may be understood by referring to FIG. 6. A small piece of sheet metal 30 has a central aperture 32 to receive a common nail 34. The piece 30 may be cut, for example, from 22 gauge or 24 gauge galvanized iron. The nail 34 extends through a common washer 35 which has an inside diameter that is substantially larger than the diameter of the nail. Thus the washer 35 serves in effect as a relatively large loop for supporting the nail.

The nail 34 is driven into the center of the corresponding wood block 22. Preferably, the nail extends all the way through the wood block and the pointed end of the nail is bent to keep it from being retracted. It is apparent that the small piece of sheet metal 30 serves as retainer means to keep the washer 35 on the nail 34.

Each of the washers 35 at each end of a rotary hollow grid 20 may be suspended from a cage 10 by a piece of wire 36 of suitable gauge. Sixteen or 18 gauge galvanized wire is suitable for this purpose. One end of the wire 36 is looped around the washer 35 and twisted around itself to make the loop permanent. The upper end of the wire 36 is looped in similar manner around a longitudinal wire 38 that forms a part of the bottom of the cage 10. The wires 36 suspend the grids 20 at sufficient distance below the cages to keep the accumulated masses of droppings on the grids from touching the cage bottoms to interfere with free rotation of the grids. The wires 36 may be longer than indicated in FIGS. 1 and 2, if desired.

The manner in which the grids 20 function for their purpose may be understood by referring to the somewhat diagrammatic views FIGS. 3, 4 and 5.

When a grid 20 is first installed the droppings from the fowls are intercepted for the accumulation of a moist mass 40 of the droppings on the upper side of the rotary grid. Only relatively few of the droppings fall into the interior of the rotary grid and it is rare that any dropping falls completely through the grid. If an isolated dropping does fall completely through the grid it is of such small size that it readily dries on the floor and especially when the floor is covered with a layer of dried droppings.

The accumulated moist mass 40 shown in FIG. 1 makes the grid top heavy in the sense that the center of gravity of the grid combined with the accumulated droppings is above the axis of rotation of the grid. Sooner or later this unbalanced condition results in rotation of the grid from the position show in FIG. 3 with the mass 40 at the top of the grid to the position shown in FIG. 4 with the mass 40 at the bottom of the grid. The vibration of the cages 10 caused by movements of the fowls therein is transmitted to the grid 20 through the suspension wires 36 to tend to cause the grid to rotate whenever it is unbalanced. It is to be noted in FIG. 1 that the wires 36 are attached to intermediate points of the wires of the bottoms of the cages 10 so that the points of connection to the cages are resiliently flexible points that vibrate readily in response to movement of the fowls.

With the grid 20 rotated to the new position shown in FIG. 4, the moist mass 40 of droppings is away from the paths of fall of the droppings so that new moist droppings are not continually added to the mass 40. The mass 40 begins to dry even when it is on the upper side of the grid and receiving new moist droppings because the grid is of open construction so that air may reach the accumulated droppings from above, below, and from all sides. When the moist mass 40 shifts to the lower position shown in FIG. 4, complete drying of the mass occurs in a short period of time and the mass becomes brittle. Intermittently, chunks 42 of the completely dried droppings break away from the underside of the grid 20 and fall to the floor in the manner indicated in FIG. 5. The dropping away of the chunks 42 from the underside of the grid correspondingly shifts the center of gravity upward to result in a new unbalanced state and thus result eventually in rotational adjustment of the grid. After a few days of service the grid with its accumulated masses of droppings has the general appearance indicated in FIG. 5 and the rate at which the chunks 42 drop from the grid is substantially equal to the rate at which the increments of droppings are added to the grid. The accumulated layer 44 of completely dried droppings on the floor 45 is incapable of incubating flies and is substantially odorless.

It is apparent that the described embodiment of the invention will suggest various changes, substitutions and other departures from my disclosure within the spirit and scope of the appended claims. For example, as indicated in FIG. 7, each end of a welded wire cylinder 20 may be attached to a circular block of wood 46 by staples 48.

I claim:

1. An apparatus to process droppings from confined fowls to prevent the incubation of flies therein and to minimize odor therefrom, comprising: a grid of hollow configuration for positioning above floor level to intercept the falling droppings for accumulation of moist masses of the droppings thereon with the masses exposed to the atmosphere from above, below and all sides, said grid being freely rotatable to rotate automatically by gravity in response to the weight of droppings thereon to shift successive portions of the grid to the paths of fall for the accumulation of successive masses of moist droppings thereon and to shift successive accumulated moist masses away from the paths of fall to permit the moist masses to dry before flies can incubate therein, and to position successive dried accumulated masses of the droppings on the underside of the grid to break away and fall from the grid.

2. An apparatus as set forth in claim 1 in which said grid is made of crossed wires forming openings of dimensions on the order of 1 inch by 2 inch.

3. An apparatus as set forth in claim 2 which includes means responsive to movements of the fowls to vibrate the grid to promote the breaking away of the successive dried masses.

4. An apparatus to process droppings from confined fowls to prevent the incubation of flies therein and to minimize odor therefrom, comprising: a rotary grid of hollow configuration; and means to support and journal the grid for free rotation above floor level in a position to intercept the falling droppings to cause the droppings to accumulate on the grid and to cause the grid to rotate by gravity in response to changes in distribution of the accumulated droppings whereby the grid rotates intermittently to bring successive portions of the grid into the paths of fall of the droppings for the accumulation thereon of successive moist masses of the droppings and to shift the successive moist masses away from the paths of fall to permit the successive moist masses to dry before flies can hatch therein and to shift the successive dried masses to positions on the underside of the grid to permit the dried masses to break away and fall from the grid.

5. An apparatus as set forth in claim 4 which includes means responsive to movements of the fowls to vibrate the rotary grid to promote the breaking away of the dried masses therefrom.

6. An apparatus to process the droppings from fowls confined in elevated cages to prevent the incubation of flies in the droppings and to minimize odor from the droppings, comprising: a grid of hollow configuration; means to journal the opposite ends of the grid for free rotation of the grid on its axis; and means to suspend said journal means from said cages to support the grid above floor level in a position to intercept the falling droppings and to transmit to the grid vibration of the cages caused by the movements of the fowls, whereby droppings accumulate on the grid and the grid rotates intermittently by gravity in response to changes in the distribution of the droppings to shift successive portions of the grid into the paths of fall of the droppings for the accumulation thereon of successive moist masses of the droppings and to shift the successive moist masses away from the paths of fall to permit the successive moist masses to dry before flies can hatch therein and to shift the successive dried masses to positions on the underside of the grid to permit the dried masses to break away and fall from the grid, and whereby the grid vibrates to promote the breaking away of the dried masses therefrom.

7. The combination with an elevated wire cage structure of means to process droppings from fowls in the cage structure to prevent hatching of eggs in the droppings, comprising: a grid of hollow configuration; means journaling the hollow grid for free rotation on its axis; and means suspending said journaling means from the cage structure with the grid above floor level in position to intercept the droppings falling from the cage structure, whereby the grid rotates intermittently by gravity in response to the weight of droppings thereon to shift successive portions of the grid into the paths of fall of the droppings for the accumulation thereon of successive moist masses of the droppings and to shift the successive moist masses away from the paths of fall to permit the successive moist masses to dry before flies can hatch therein and to shift the successive dried masses to positions on the underside of the grid to permit the dried masses to break away and fall from the grid.

8. A combination as set forth in claim 7 in which said suspending means is connected to a portion of the cage that is vibrated by the movements of the confined fowls whereby the grid is vibrated to promote the breaking away of the dried masses of droppings.

References Cited in the file of this patent

UNITED STATES PATENTS

| | | |
|---|---|---|
| 1,730,398 | Walterhouse | Oct. 8, 1929 |
| 1,876,371 | Westlund | Sept. 6, 1932 |